United States Patent [19]
Fischer et al.

[11] Patent Number: 6,076,089
[45] Date of Patent: Jun. 13, 2000

[54] COMPUTER SYSTEM FOR RETRIEVAL OF INFORMATION

[75] Inventors: Peter Fischer, Bremen; Uwe Keck, Leonberg, both of Germany

[73] Assignee: International Business Machines Corporation, Armonk, N.Y.

[21] Appl. No.: 08/006,860

[22] Filed: Jan. 21, 1993

[30] Foreign Application Priority Data

Apr. 27, 1992 [EP] European Pat. Off. ............. 92107142

[51] Int. Cl.$^7$ ................................................. G06F 17/30
[52] U.S. Cl. ............................................................ 707/102
[58] Field of Search ............................. 395/600; 707/102

[56] References Cited

U.S. PATENT DOCUMENTS

| | | | |
|---|---|---|---|
| 4,914,569 | 4/1990 | Levine et al. | 395/500 |
| 4,945,475 | 7/1990 | Bruffey et al. | 395/600 |
| 5,089,952 | 2/1992 | Bozman | 395/725 |
| 5,121,493 | 6/1992 | Ferguson | 395/600 |
| 5,202,986 | 4/1993 | Nickel | 395/600 |
| 5,204,958 | 4/1993 | Cheng et al. | 395/600 |
| 5,283,894 | 2/1994 | Deran | 395/600 |

OTHER PUBLICATIONS

R. Bayer et al., "Organization and Maintenance of Large Ordered Indexes", Acta Informatica 1, Springer–Verlag 1972, pp. 173–189.

D. Comer, "The Ubiquitous B–Tree", Computing Surveys, vol. II, No. 2, Jun. 1979, Computer Science Department, Purdue University, West Lafayette, Indiana, 47907, pp. 121–137.

A.L. Rosenberg et al., "Construction of Minimal–Comparison 2,3–Trees", IBM Technical Disclosure Bulletin, vol. 20, No. 2, Jul. 1977, pp. 846–848.

R. Bayer et al., "Prefix B–Trees", ACM Trans. on Database Systems, vol. 2, No. 1, Mar. 1977, pp. 11–26.

E.M. McCreight, "Pagination of B*–Trees with Variable–Length Records", Comm. of the ACM, Sep. 1977, vol. 20, No. 9, pp. 670–674.

D.E. Knuth, editor, "The Art of Computer Programming", vol. 3, Sorting and Searching, chap 6.2.4, Multiway Trees, pp. 471–480, Addison–Wesley Publishing Company.

Sedgewick, Algorithms, Section 18, "External Searching", pp. 225–235, Addison–Wesley 1983.

*Primary Examiner*—Wayne Amsbury
*Attorney, Agent, or Firm*—Ronald L. Drumheller

[57] ABSTRACT

The invention concerns a computer system for retrieval of information, $\alpha_i$, wherein a tree (T, T*) of nodes is used to store entries of an index. An entry in a node comprises a key $x_i$ having some information $\alpha_i$ assigned thereto. The nodes of the tree (T, T*) may either be empty or comprise up to 2k entries, where k is a natural number.

1 Claim, 7 Drawing Sheets

COMPUTER SYSTEM FOR RETRIEVAL OF INFORMATION

FIELD OF THE INVENTION

This invention relates to the field of using index structures to retrieve information from a computer.

BACKGROUND OF THE INVENTION

Methods of organizing large files so that some form of random access is supported have been recognized as important in the art. A particularly successful organization is that of B-trees. This approach is described in an article entitled "Organization and Maintenance of Large Ordered Indexes" by R. Bayer and E. McCreight, in Acta Informatica 1.3 pp. 173–189 (1972). In general, each node in a B-tree of order k contains at most 2k keys and 2k+1 pointers. Actually, the number of keys may vary from node to node, but each must have at least k keys and k+1 pointers. As a result, each node is at least 50% full, but generally much higher. In the usual implementation a node forms one record of the index file, has a fixed length capable of accommodating 2k keys and 2k+1 pointers, and contains additional information telling how many keys reside correctly in the node.

Several variances of B-trees have been developed as described e.g. in "Prefix B-Trees", by R. Baier and K. Unterauer, ACM Transactions on Data Base Systems, 2.1, pp. 11–26 (March 1977). An important advantage of B-tree organizations over hashing methods is that not only random access is supported, but also sequential access.

A B-tree is, of course, a tree structured organization, and like all trees used in searching, it is desirable to minimize its height so as to keep the access path to its leafs as short as possible. This is particularly important when dealing with large files since accessing a node in the tree can mean an additional access to external storage. Since such external storage is usually a disk with a substantial seek time and rotational delay, each such additional access is quite expensive.

In order to reduce the height of B-trees, a modified version, called B*-trees, was introduced (cf. E. McCreight McRide, "Pagination of B-*Trees with Variable Lengths Records", in Communications of the ACM, September 1977, Volume 20, No. 9). The two distinguishing properties of B*-trees which separate them from B-trees are:

a) All records of the file are stored in leaf nodes, thus other nodes of the tree contain only index entries.

b) The number of necessary splitting operations of nodes is reduced by the use of an overflow technique that increases the average storage utilization of each node.

The basic B-tree organization can be further improved by key compression techniques, as suggested by D. E. Knuth "The Art of Computer Programming", Volume 3/Sorting and Searching, Addison-Wesley, Menlo Park, Calif. (1973). This results in increased fan out for each node, i.e. more entries per node, and hence reduces the number of disk accesses, on average, required to read a record.

The performance of the B-tree concept is optimal for equally distributed data or with other words the height of the B-tree is minimal in this case. Sorted data may also be stored in a B-tree, but in this case the performance of the B-tree concept is not optimal. A common disadvantage of the basic B-tree and its variances, especially when used for sorted data, consists in the number of split operations which have to be performed when data are subsequently stored in the tree and the low percentage of storage utilization. A low percentage of storage utilization is a major drawback, if high speed searching is to be performed in the tree.

OBJECTS OF THE INVENTION

It is therefore an object of the invention to provide a computer system for retrieval of information and a method of operating a storage means of a computer system featuring an improved tree-like index structure.

SUMMARY OF THE INVENTION

The invention concerns a computer system for retrieval of information, said computer system comprising storage means being adapted to store an index structure, said index structure comprising a tree (T, T*), whereby each path from the root node to any leaf node of said tree has the same length h, where h equals the number of nodes in a path, a key having said information assigned thereto is stored on one of said nodes, and each node has at most 2k+1 sons, where k is a natural number.

Further, the invention concerns a method of operating a storage means of a computer system, whereby a sequence of keys is to be stored in the storage means in the form of a tree with one or more nodes, at least some of the keys having information assigned thereto, the keys being ordered in an increasing or decreasing sequence.

The improved index structure of the invention is deviating from the basic B-tree concept in several important aspects. First, in the index structure of the invention there may be empty nodes within the tree having no keys or information assigned thereto but only pointers to its sons. Second, splitting operations of nodes during subsequent storage operations of data are made obsolete by the teaching of the invention.

This greatly enhances the speed of information retrieval, since storage utilization is near 100%. A high degree of storage utilization implies, that the order of the tree-like structure or with other words its height may be kept at a minimum. The advantages of the inventive index structure become more apparent if one considers the following example: If a key having information assigned thereto is to be retrieved in the inventive tree-like index, each node encountered in the path from the root to the corresponding leaf of the tree-like index requires access to a storage means such as a magnetic disk. Since the average access mechanism delay generally is much longer than the clocking frequency of a computer system, the number of accesses to be performed for retrieval of a particular key is crucial for the performance of the entire system. A minimized height of the tree-like index structure according to the teaching of the invention therefore greatly speeds up queries in a computer system for retrieval of information.

A tree-like index structure according to the invention, which has a storage utilization approaching 100%, is built up with data to be stored on the nodes of the tree in ordered sequence. For most applications this is not an important constraint. If the keys of the information to be stored are not per se in an ordered sequence, the keys have to be sorted prior to storage of the keys on the nodes of the tree-like structure according to the invention.

The inventive concept may be employed advantageously to realize a high speed full text retrieval system. In the usual approach to full text retrieval, the processing of queries does not directly involve the original text files, but rather the auxiliary dictionary and concordance files. A dictionary is the list of all relevant different words appearing in a selected set of text files and is usually ordered alphabetically. The concordance contains, for every word of the dictionary, the lexico-graphically ordered list of references to all its occurrences in the text files. Each reference in this list stored in the concordance describes the exact location of an occurrence of a specific word in the text. The concordance is accessed via the dictionary, which contains for every word a pointer to the corresponding list in the concordance.

The dictionary and the concordance or at least a pointer to the concordance may be stored in the inventive tree-like index structure, so that the speed of retrieval of certain words in the text files may be enhanced. Each word in the dictionary together with its concordance or together with a pointer to its concordance may be stored on a node of the index structure. Further, it is also possible to store the assignment of names of text documents to their identifiers, which are employed internally in the computer system, on a similar index structure.

DETAILED DESCRIPTION OF THE INVENTION

Figure 1:
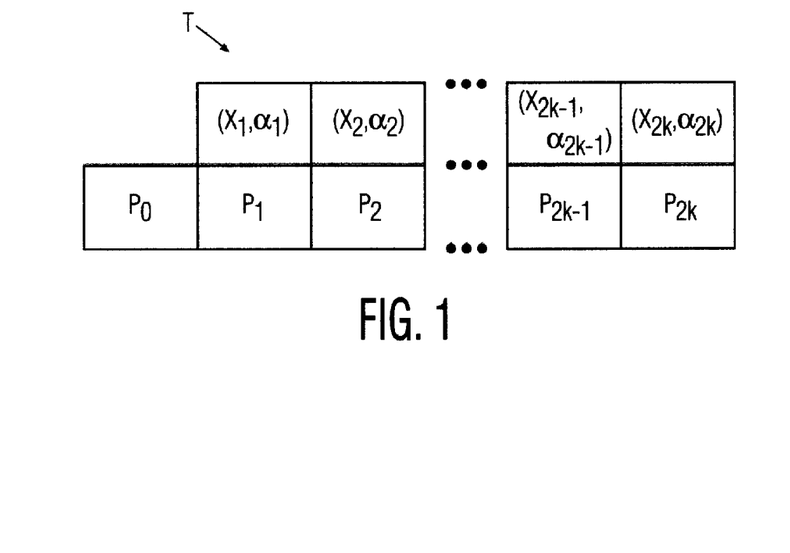
FIG. 1 shows the basic organization of the index structure according to a first embodiment of the invention.

With reference to FIG. 1 the basic organization of a page in a tree-like index structure T is described in the following. The nodes on which the index entries are stored are the nodes of the tree T. Each node can hold up to 2k keys, where k is a natural number and is also called the order of the tree T. An entry in the node shown in the FIG. 1 usually comprises a key $x_i$ and some associated information $\alpha_i$. The key $x_i$ identifies a unique element in the index, whereas the associated information $\alpha_i$ is typically a pointer to a record or a collection of records in a random access file.

In addition the data structure for the index has the following properties:

a) Each node holds between 0 and 2k keys except the root node which may hold between 1 and 2k keys.

b) If the number of keys on a page P, which is not a leaf node, is L then the node P has L+1 sons.

c) Within each node P the keys are sequential in increasing or decreasing order: $x_L, x_2, \ldots, x_1$, where $0 \leq L \leq 2k$.

Furthermore, the node P contains L+1 pointers $p_0, p_1, \ldots, p_L$ to its sons. On leaf nodes these pointers are undefined. This results in the organization of a node shown in FIG. 1. The pairs $(x_1, \alpha_1), (x_2, \alpha_2), \ldots, (x_{2k}, \alpha_{2k})$ shown in FIG. 1 symbolize the entries of index elements which are pairs $(x_i, \alpha_i)$ of a key $x_i$ and some associated information $\alpha_i$. The pointers $p_0, p_1, \ldots, p_{2k}$ shown in FIG. 1 symbolize the pointers of a node in the tree T pointing to the sons of this node. If the node shown in FIG. 1 should be a leaf node, the pointers p would be undefined.

For the trees T considered here the following conditions shall hold:

1. $(\forall y \in K(p_0))(y < x_1)$,

2. $(\forall y \in K(p_i))(x_i < y < x_{i+1}); i=1, 2, \ldots, L-1$

3. $(\forall y \in K(p_N))(x_L \leq y)$.

where P(p) is the node to which p points and K(p) is the set of keys on the nodes of that sub-tree of which P(p) is the root. Thus the keys $x_1, \ldots, x_i$ are the keys stored on the node P(p) and $p_0, \ldots, p_L$ are the pointers stored on the node P(p). It is to be noted, that condition 3. does not hold, if the pointer $p_1$ points to an empty sub-tree having no keys stored thereon. By the above described organization of the nodes of the tree T, it is simple to retrieve a key y on an arbitrary node of the tree T. This will be described in more detail in the following.

Figure 2:
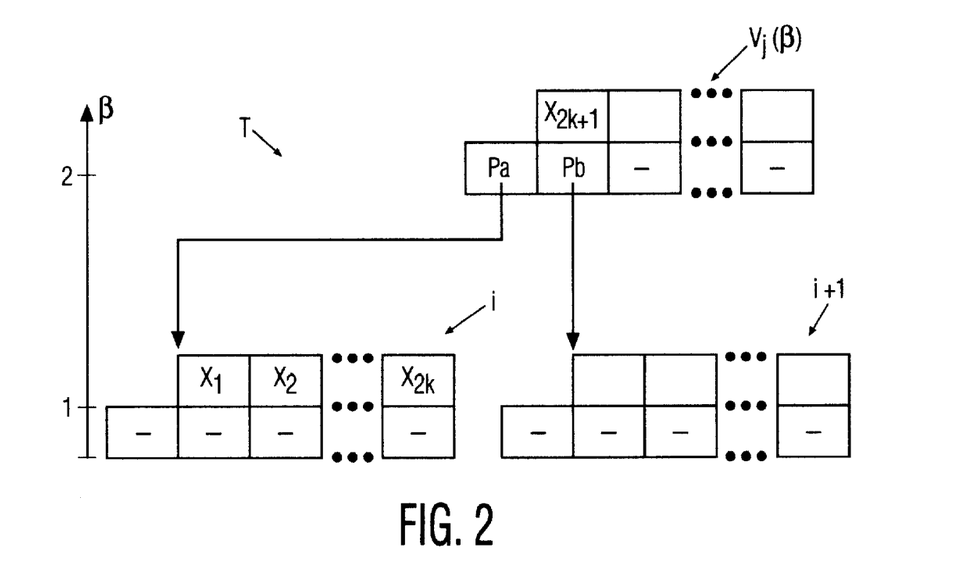
FIGS. 2 and 3 illustrate how the inventive tree-like index structure is built successively.
Figure 3:
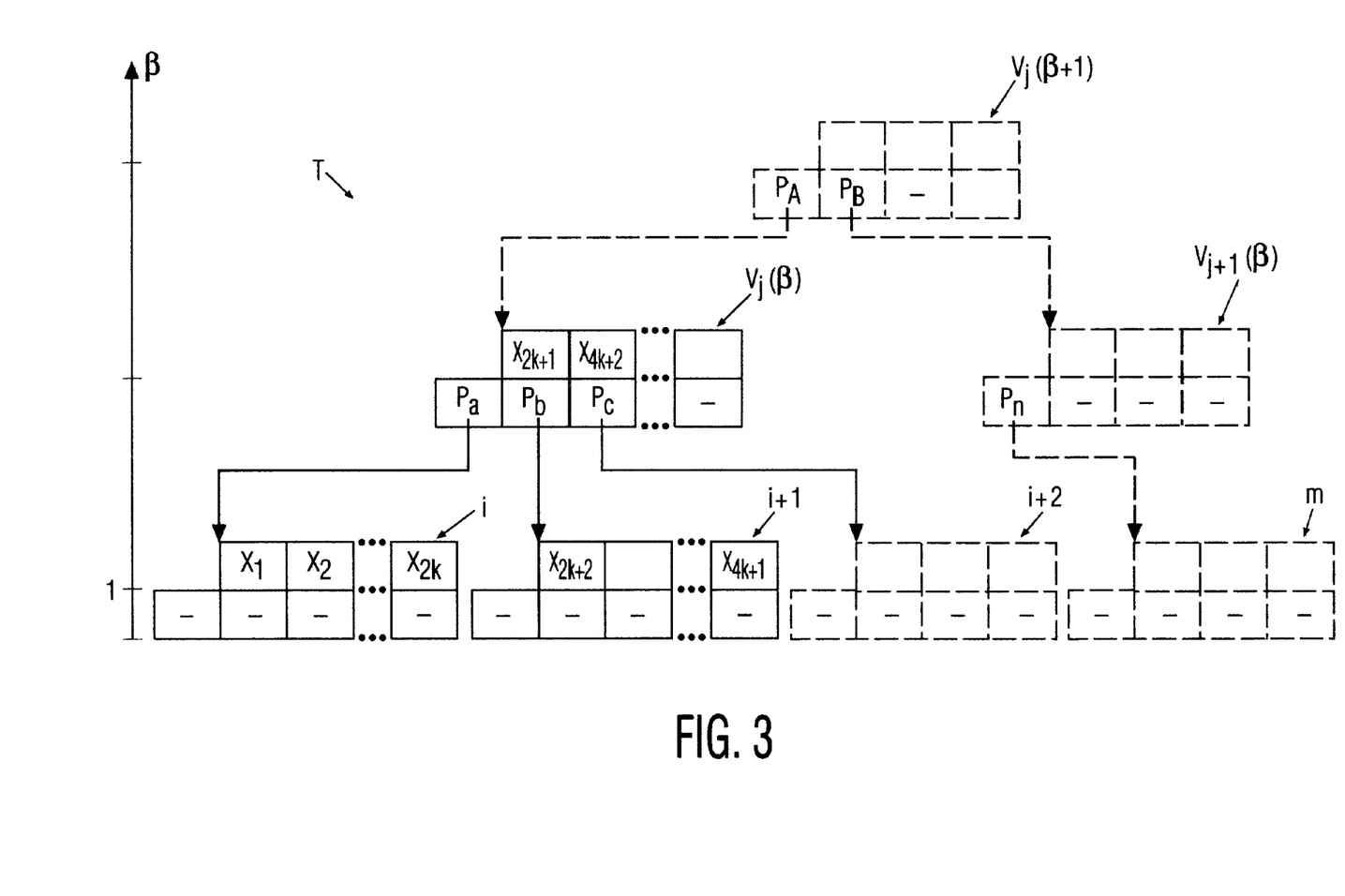

With reference to FIGS. 2 and 3 now, it is described by way of example how a tree T is successively built up.

The tree T shown in FIG. 2 has three nodes i, i+1 and $V_j(\beta)$. The axis $\beta$ on the left side of FIG. 2 indicates the levels of the tree. In this case nodes i and i+1 are situated on level 1 and node $V_j(\beta)$ is situated on level 2, as it is indicated by the respective numbers on the axis $\beta$.

When the tree T shown in FIG. 2 is built up, first k is defined, where k is a natural number and is also called the order of the tree T. Second, an empty node i is defined, which may hold up to 2k keys $x_i$. Third, storage operations may take place, filling the storage node i by subsequent storage operations with keys $x_1, \ldots, x_{2k}$. This is symbolized by the entries $x_1, \ldots, x_{2k}$ in node i shown in FIG. 2, where the associated information $\alpha_i$ is left out in order to simplify the diagram. The boxes shown in FIG. 2 having a "–" sign therein symbolize storage locations of pointers p. On the node i these pointers p remain undefined, since node i does not have any sons. If an additional key $x_{2k+1}$ is to be entered in the tree T, it is not possible to store the key $x_{2k+1}$ on the node i, since the node i is already completely filled. Therefore the following operation takes place:

Two additional empty nodes $V_j(\beta)$ and i+1 are defined, where the node $V_j(\beta)$ is the new root node of the tree T replacing node i which is no longer the root node of the tree T. The node i+1 is an additional empty leaf node, which is on the same level 1 as node i, whereas the node $V_j(\beta)$ is on the level 2 of the tree T. The key $x_{2k+1}$ which is to be stored on the tree T is entered on the new root node $V_j(\beta)$. Further the new root node $V_j(\beta)$ comprises pointers $p_a$ and $p_b$ pointing to the sons of the new root node $V_j(\beta)$. This is indicated in FIG. 2 by the arrows pointing from pointer $p_a$ to the node i and from pointer $p_b$ to the node i+1. Logically the nodes i and i+1 are the sons of the father node $V_j(\beta)$ which is also the root node of the tree T.

If further keys are to be entered, this procedure is continued. The subsequent 2k keys $x_{2k+2}$ to $x_{4k+1}$ are stored on the additional leaf node i+1 until it is full. The next key $x_{4k+2}$ is stored again on the root node $V_j(\beta)$ as shown in FIG. 3. The entry of the key $x_{4k+2}$ necessitates the entry of an additional pointer $p_c$ pointing to an additional empty leaf node i+2 as it is outlines in FIG. 3.

If even further keys $x_i$ are to be stored on the tree T, this procedure continues analogously until all nodes of the tree T and especially the root node $V_j(\beta)$ are completely filled. The request for storage of additional keys $x_i$ necessitates the repetition of the above described procedure on a higher level of the tree T: A new root $V_j(\beta+1)$ is defined replacing the former root node $V_j(\beta)$. Thereby the height of the tree is incremented by 1. Additional empty internal nodes and an additional empty leaf node are defined as well. In this case only one additional empty internal node $V_{j+1}(\beta)$ is defined, but as one proceeds to higher levels of the tree in subsequent storage operations, the definition of further additional internal nodes is necessary. The additional empty leaf node is the node m shown in FIG. 3. The new root node $V_j(\beta+1)$ has a pointer $p_A$ pointing to the former root node $V_j(\beta)$ as well as a pointer $p_B$ pointing to the additional empty internal node $V_{j+1}(\beta)$ which is its son. The additional internal node $V_{j+1}(\beta)$ has a pointer $p_n$ pointing to its son which is also empty. In this case the son is the additional empty leaf node m, but in other cases the son of $V_{j+1}(\beta)$ may be a further additional empty internal node, which again points to its son. This constitutes a chain of pointers pointing from the root node $V_j(\beta+1)$ to the additional empty leaf node m.

Figure 4:
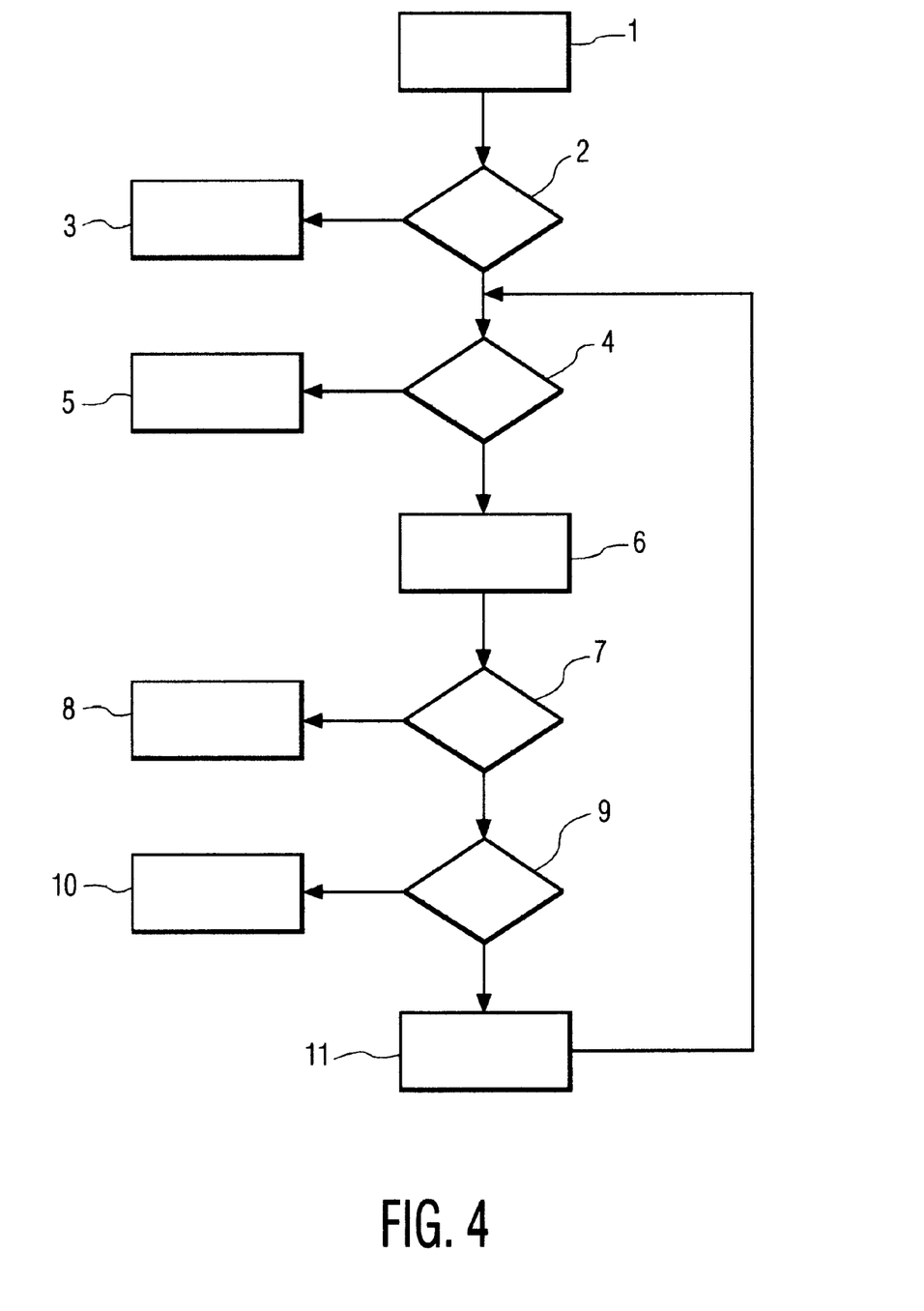
FIG. 4 is a flow-chart showing the procedure of insertion of an additional key into the tree-like index structure.

The above described procedure of building up the tree T is explained more systematically and in more general terms with reference to FIG. 4 showing a flow-chart of the procedure. The point of departure of the procedure shown in the flow-chart of FIG. 4 is that an arbitrary leaf node of the tree T is just completely filled by a storage operation L and a further key is to be stored on the tree T by a subsequent storage operation L+1. In the example shown in FIG. 2 the arbitrary leaf node is the node i which is filled by keys $x_i$ to $x_{2k}$, whereby the key $x_{2k}$ is entered by the storage operation L. In this example the further key is the key $x_{2k+1}$ which is to be stored by the subsequent storage operation L+1. This necessitates the definition of an additional leaf node corresponding to step 1 on the flow-chart. In the example shown in FIG. 2 the additional leaf node is the node i+1. In step 2 it is decided whether the arbitrary leaf node does have a father node $V_j(\beta)$. If this is untrue step 3 is carried out. In step 3 a father node $V_j(\beta)$ of the arbitrary leaf node is defined, whereby this father node $V_j(\beta)$ is the new root node of the tree T. A pointer $p_a$ to the arbitrary leaf node and pointer $p_b$ to the additional empty leaf node defined in step 1 as well as the further key are entered on the new root node $V_j(\beta)$ analogously as shown in the example of FIGS. 2 and 3.

If it is decided in step 2, that the arbitrary leaf node does have a father node $V_j(\beta)$, step 4 is carried out. First in step 4 the father node $V_j(\beta)$ of the arbitrary leaf node is denoted "present father node V". Second it is decided whether the present father node V is completely filled. If this is untrue, the further key is simply entered in the present father node V in step 5 as well as a pointer pointing from the present father node V to the additional leaf node.

If this is true the procedure continues iteratively, whereby the corresponding loop shown in flow-chart of FIG. 4 comprises the steps 4 to 11. In step 6 there is defined an additional node which is adjacent to the present father node and is thus on the same level $\beta$ of the present father node. A pointer p is entered on the additional node, whereby the pointer p points to said additional leaf node or to another additional node one level B-1 below the level $\beta$ of said additional leaf node. This serves to define a chain of pointers going from the root of the tree T to the additional leaf node corresponding to pointers $p_B$, $p_n$ of FIG. 3.

In step 7 it is decided whether the present father node V has a father node ($\beta$+1). If this is untrue step 8 is carried out. In step 8 a father node V($\beta$+1) of the present father node V is defined. The father node V($\beta$+1) comprises a pointer to the present father node and to said additional node. The further key is entered on the father node V($\beta$+1).

If it is decided in step 7 that the present father node V has a father node V($\beta$+1), step 9 is carried out. In step 9 it is decided whether the father node V($\beta$+1) of the present father node V is completely filled. If this is untrue step 10 is carried out. In step 10 the further key is entered on the father node V($\beta$+1).

If it is decided in step 9, that the father node V($\beta$+1) of the present father node V is completely filled, step 11 is carried out. In step 11 the father node $V_{(\beta+1)}$ of the present father node V is denoted the present father node V. Then the control returns back to step 4.

The above described iterative procedure stops, if one of the decisions taken in steps 4, 7 or 9 results in "untrue" and thus initiating a storage operation of the further key. Subsequently the additional leaf node is filled by further keys until it is completely filled. If even further keys are to be stored subsequently the same procedure comprising steps 1 to 11 is evoked again as described above. It is to be noted that the keys $x_i$ which are entered on the tree T are in sequential order—generally in increasing or decreasing order. By way of example it is assumed in the following that the keys $x_i$ are sorted in increasing order so that $x_{i-1} < x_i$. If a key y is searched, the following procedure takes place: First, starting from the root node of the tree T, it is decided whether the left most key $x_{2k+1}$ stored on the root node is greater than y ($y < x_{2k+1}$). If this is true the search is continued on the left descendent node i to which the left most pointer $p_a$ of the root node $V_j(\beta)$ points as it is depicted i.e., in FIG. 3. Second, it is decided whether the right most key $x_1$ stored on the root node is lesser than the key y. In the example shown in FIG. 3 the right most key is the key $x_{4k+2}$. If there is such a key the search is continued on the right descendent node. Third it is decided whether there are two keys $x_i$ and $x_{i+1}$ stored on the root node, where $x_i < y < x_{i+1}$. If such a pair of keys $x_i$ and $x_{i+1}$ exists, the search is continued on the node to which the pointer $p_i$ of the key $x_i$ points. This procedure is continued until a match between the key y which is searched and a key $x_i$ stored on a node of the tree T occurs. In this case the search ended successfully and it is possible to access the associated information $\alpha_i$ assigned to said key y. In the example shown in FIG. 3, this would be the case if the key y is the key $x_{2k+2}$, since $x_{2k+1} < x_{2k+2} < x_{4k+2}$. In this case the pointer $p_i$ is the pointer $p_b$ and the search is continued on node i+1, where a match occurs. If however the search continues to a leaf node i and no match occurs on the leaf node i the search ends unsuccessfully and the conclusion is drawn that no key y is stored on the tree T.

If it should occur that the search continues on an empty node, the search simply proceeds to the node to which the empty node points.

Figure 5:
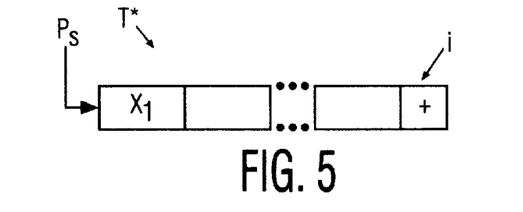
FIG. 5 shows the basic organization of a node of the index structure of a second embodiment of the invention.

In the following a second preferred embodiment of the invention is described in detail with reference to FIGS. 5 to 10. FIG. 5 shows the basic organization of a node on a tree T*. The node shown in FIG. 5 may hold up to 2k keys $x_i$, where k again is the order of the tree T*. In contrast to the first preferred embodiment of the invention, the keys $x_i$ have no individual pointers assigned thereto. However there is a first pointer $P_s$ shown in FIG. 5 pointing to the first entry $x_1$ on the node. The pointer $P_s$ serves to initialize sequential searches on the leaf nodes of the tree T* as it will be described in the following. The node may also hold an additional pointer $P_a$. The storage location of the pointer $P_a$ is indicated in FIG. 5 by a "+" sign.

Figure 6:
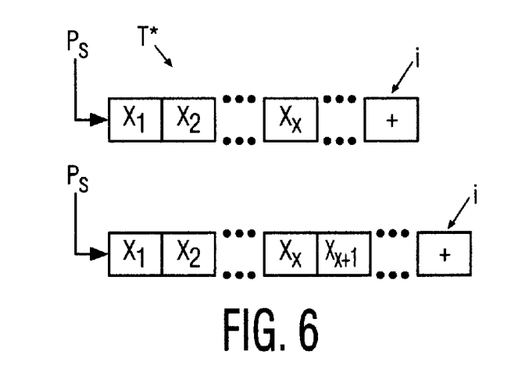
FIGS. 6, 7, 8, 9, 10 illustrate how a tree-like index structure is built successively according to the second embodiment of the invention.
Figure 7:
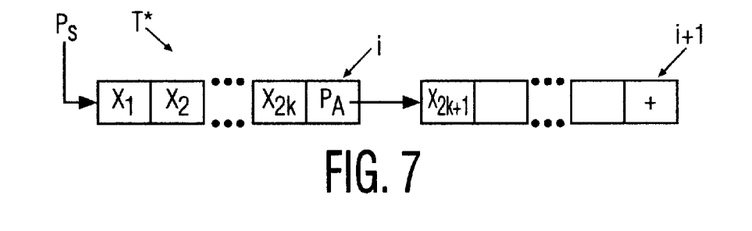

FIG. 6 shows the node i after storage of additional $x_2$ to $s_x$ and after storage of additional keys $x_2$ to $x_{x+1}$, respectively. If the node i is completely filled with keys $x_1$ to $x_{2k}$ and there is a request to store a further key $x_{2k+1}$, this necessitates the definition of an additional node i+1 in which the further key $x_{2k+1}$ is entered. Further the pointer $P_A$ is entered on the node i, whereby said pointer $P_A$ points to the first key $x_{2k+1}$ of the node i+1. In order to build up the tree T* a separator $s_x$ is defined now. The separator $s_x$ is a key like in the first preferred embodiment of the invention, but has no information $\alpha_i$ assigned thereto. The separator $s_x$ just serves for purposes of retrieval of information $\alpha_i$ assigned to the keys $x_i$ stored on the leaf nodes i, i+1 of the tree T*. For the separator $s_x$ the following condition shall always hold:

$$x_{2k} \leq s_x < x_{2k+1},$$

where $x_{2k}$ is the last key which is entered on node i and thus completely filling the node i and $x_{2k+1}$ is the first key entered on the additional leaf node i+1.

Figure 8:
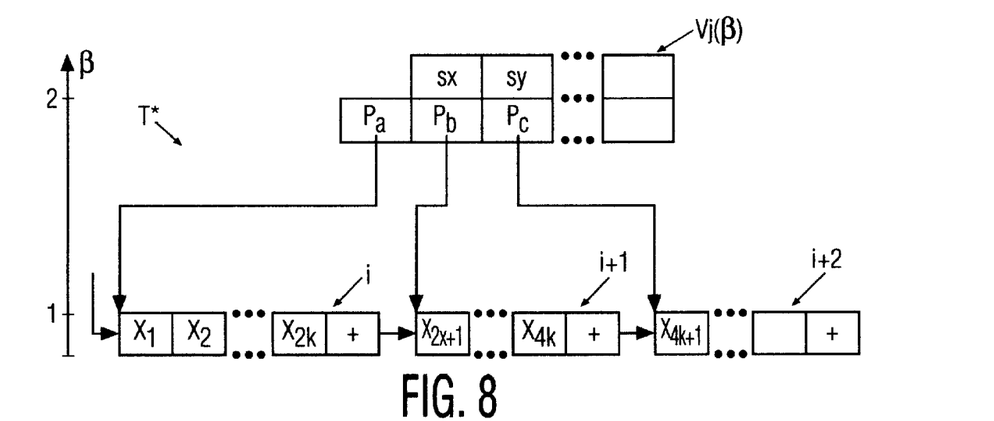

The definition of an additional node i+1 necessitates the definition of a new root node $V_j(\beta)$ replacing the former root node i of the tree T*. The separator $s_x$ is entered on the first storage position on the new root node $V_j(\beta)$. In addition, the pointers $p_a$ and $p_b$ are entered on the root node $V_j(\beta)$, where $p_a$ points to the node i and the pointer $p_b$ points to the node i+1 as it is indicated in FIG. 8 by the corresponding arrows. The structure of the internal nodes and of the root node of the tree T* is exactly the same as the structure of the nodes of the tree T as shown in FIG. 1, apart from the fact that the keys $s_x$ have no information $\alpha_i$ assigned thereto. FIG. 8 shows the tree T* after the entry of a further key $x_{4k+1}$ on an additional node i+2 and entry of the corresponding key $S_y$ on the root node $V_j(\beta)$. Additionally a pointer $p_c$ pointing to the additional leaf node i+2 is also stored on the node $V_j(\beta)$.

Figure 9:
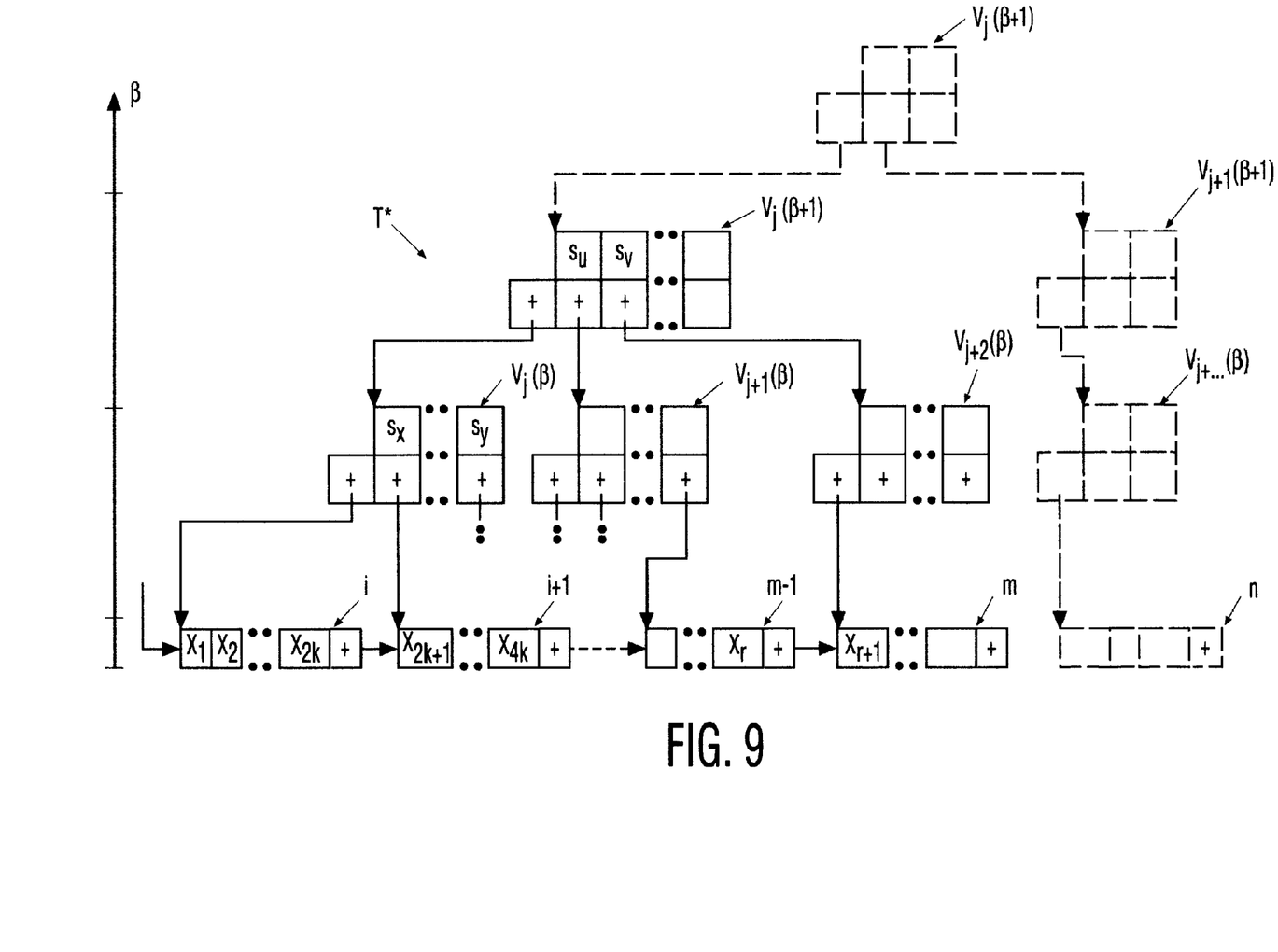

FIG. 9 shows the tree T* after additional keys $x_i$ have been stored. By way of example, the key $x_r$ is considered to be the last key stored on the tree T* on the leaf node m−1. If a further key $x_{r+1}$ is to be stored on the tree T*, an additional empty leaf node m is defined and the further key $x_{r+1}$ is the first entry stored on this additional leaf node m. Subsequently a separator $S_v$ has to be defined according to the above condition ($x_r < S_v < x_{r+1}$). The separator $S_v$ is a key, which is entered on the tree T* according to the above described procedure illustrated in FIG. 4: Before the key $x_{r+1}$ was stored on the additional leaf node m, the last entry of a key $x_r$ took place on the node m−1. The node m−1 has a father node $V_{j+1}(\beta)$, which is called the present father node according to step 4 of the above explained procedure. Since the present father node is completely filled the procedure enters the iterative loop comprising the steps 4 to 11. In step 6 an additional node $V_{j+2}(\beta)$ is defined on the level of the present father node. Further it is determined that the present father node has a father $V_j(\beta+1)$ according to step 7. Since the father $V_j(\beta+1)$ of the present father node is not full, the key $S_v$ is entered in the father $V_j(\beta+1)$ of the present father node.

If the new root node $V_j(\beta+1)$ is subsequently completely filled by additional storage operations, this necessitates the definition of a new root $V_j(\beta+2)$ replacing the former root node $V_j(\beta+1)$. Furthermore additional empty internal nodes $V_{j+1}(\beta+1)$ and $V_{j+...}(\beta)$ as well as an additional leaf node n are defined.

Figure 10:
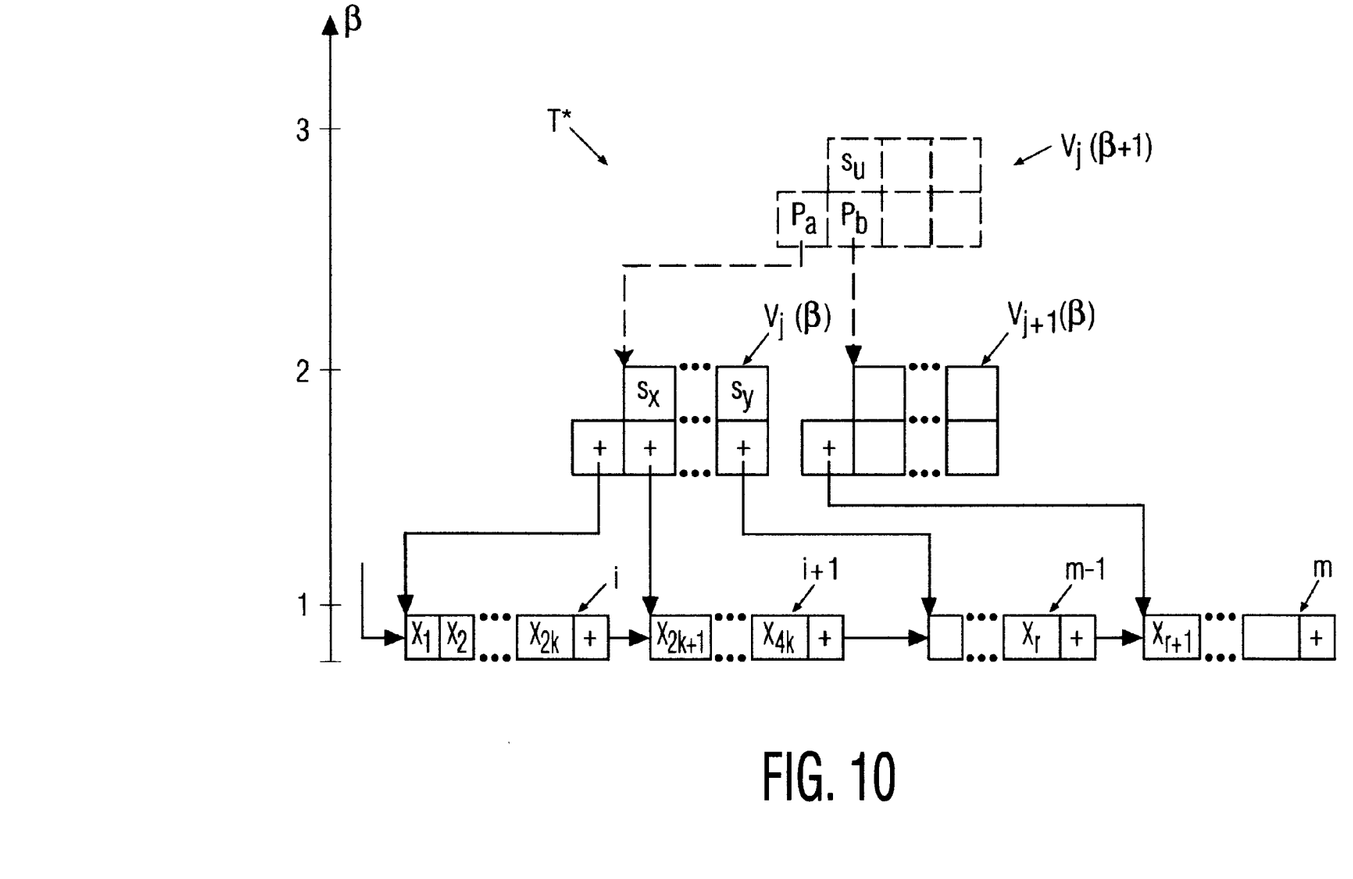

The definition of a new root node $V_j(\beta+1)$ is explained in more detail with reference to FIG. 10. The root node of a sub-tree of the tree T* shown in FIG. 10 is the node $V_j(\beta)$ being completely filled. The last entry which was made on this sub-tree is the key $x_r$ on the leaf node m−1. An additional key $x_{r+1}$ is stored on the additional leaf node m. The corresponding separator again has to satisfy the condition $x_r < S_u < x_{r+1}$. According to step 2 of the above described procedure it is determined that the leaf node m−1 has a father node $V_j(\beta)$. Thus this father node $V_j(\beta)$ is denoted the present father node in step 4. Since the present father node is completely filled, the control of the procedure turns over to the iterative loop. In step 6 an additional node $V_{j+1}(\beta)$ is defined. Subsequently in step 7 it is determined that the present father node has no father, since it is the root of the tree T*. Consequently in step 8 a father node $V_j(\beta+1)$ of the present father node is defined and pointers $p_a$ and $p_b$ as well as the separator $S_u$ are entered on the father node $V_j(\beta+1)$ of the present father node. Thereby the storage operation is completed.

If a key y is searched in the tree T*, the same rules as in the first preferred embodiment of the invention may be applied for retrieval of the key y. However it is also possible to search sequentially on the leaf nodes if the first pointer $p_s$ is employed to initialize the search. This is also due to the fact, that in every leaf node i there is a pointer $p_A$ pointing to its adjacent leaf node, if there should be an adjacent leaf node. This sequential searching may be performed according to the procedures known for B* trees (cf. E. McCreight "Pagination of B* Trees with Variable Lengths-Records", Communications of the ACM, September 1977, Vol. 20, No. 9).

If a tree T* is employed allowing variable lengths entries on the internal nodes, the separators should be chosen to be as short as possible. This results in a larger number of separators which may be stored on one internal node. A large number of separators stored on one internal node is advantageous, since this further minimizes the height of the tree T*. A reduced height of the tree T* results in a reduced number of access operations to the storage device. Since the time necessary to access a storage device, such as a magnetic disk or the like, is substantially longer than the clocking rate of a processor, the speed of retrieval is considerably increased thereby.

A possible application in which the advantages of the inventive method and system are especially highlighted is described in the following.

The inventive method may be employed in a full-text retrieval computer system. Usually a full-text retrieval computer system comprises a concordance list which contains for every different word W of the data base, a list L(W) of "coordinates", each of which describes the exact location of an occurrence of a word W in the text. In general, the concordance list and the data base are kept on separated storage means.

According to the teaching of the present invention, the concordance list is stored on a tree T*.

First, all relevant words are extracted from a set of selected documents stored in the data base. Additional information $\alpha_i$ is assigned to each word. The additional information $\alpha_i$ comprises the list L(W) of occurrences of a relevant word W in a specific document. Second, all words extracted from said set of documents is sorted alphabetically and thereby sorted in increasing order. The words W are stored on the tree T whereby the words W serve as keys $x_i$.

Figure 11:
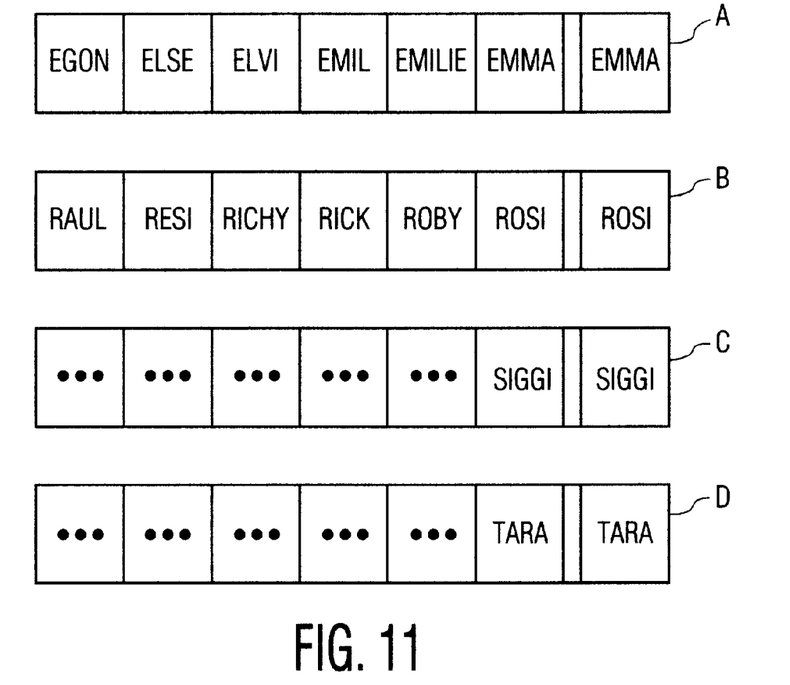
FIGS. 11 and 12 show an example of an index structure according to the invention to be employed in a text retrieval system.
Figure 12:
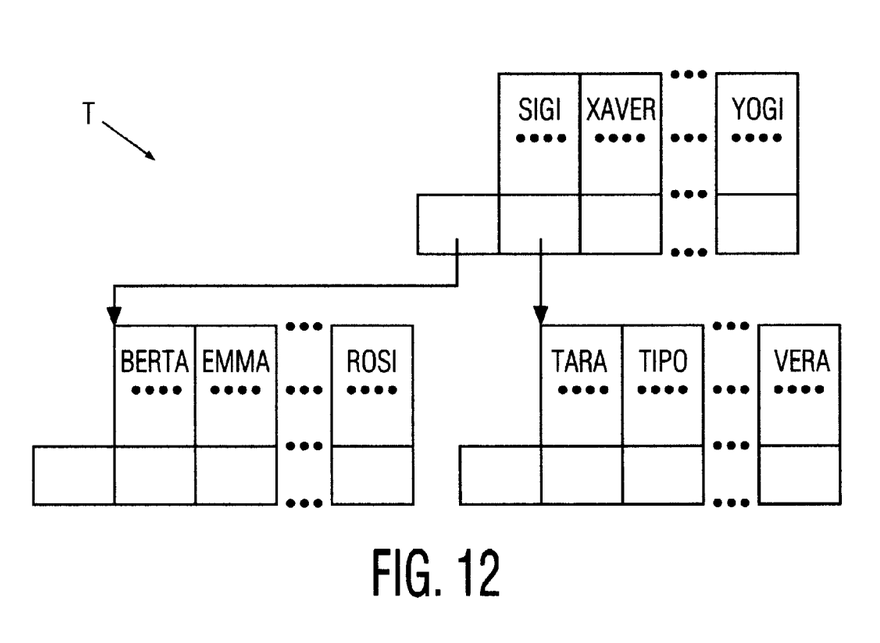

It is also possible to unite a sub-sequence of alphabetically ordered words to a data block. The last entry on the data block may serve as the key $x_i$ for this block. In FIG. 11 four data blocks A, B, C, D are shown. The data block A has the key "Emma", block B has the key "Rosi", block C has the key "Siggi" and block D has the key "Tara". These keys may be stored on the tree T as shown in FIG. 12. In the tree T shown in FIG. 12 further example data are included.

Searches in the tree T are performed according to the above described procedure. If the word "Else" for example is searched, the search procedure will lead to the key "Emma" stored on the left leaf node in FIG. 12. Since "Emma" does not exactly match "Else" the data block A is sequentially searched for an exact match. In the case considered here such a match is found and the associated list L(Else) of occurrences of "Else" may be accessed.

Usually the actual names of the documents stored in the data base of a full-text retrieval computer system are not used internally in the system. In most cases the actual document number is not used internally but another number or name which is assigned automatically to the document. The inventive system or method may also be employed to store the assignment of the actual document number and the document number or name which is assigned automatically by the computer system.

Further, it is to be noted that the performance of the inventive computer system and method may be optimized by the choice of the parameter k, which is the order of the tree T or T*. If the parameter k is chosen in consideration of the access mechanism delay of the storage means on which the index is stored and the time necessary for data transfer from the storage means to the processor of the computer, this may further enhance the speed of retrieval of a certain key in the index. A large value of the parameter k provides a tree T or T* which has a small number of levels $\beta$. This is desirable since a small number of levels $\beta$ implies a small number of nodes in a path from the root node to a leaf node of the tree T or T* on which the key to be retrieved may be stored. A small number of nodes in the search path from the root node to a leaf node logically implies a small number of access operation to the storage means, since every node in the path requires an additional access operation. However, the large value of the parameter k also implies that a lot of keys and pointers may be stored on the nodes of the tree, so that the transfer of the data stored on a node from the node to the processor takes a relatively long period of time. This is due to the fact that the maximum number of keys and pointers, which may be stored on a node, equals 2k and 2k+1, respectively. Thus, the time necessary for a sequential search on a certain node for the key which is to be retrieved in average is longer than for small values of the parameter k. An optimal value of the parameter k may be obtained experimentally by varying the parameter k and measuring the resulting overall times necessary for retrieval of a key y in the index. For another class of trees, R. Bayer and E. McCreight proposed in the above cited article "Organization and Maintenance of Large Ordered Indexes" a value of the parameter k between 64 and 128.

What is claimed is:

1. A computer system for retrieval of information, said computer system comprising storage means being adapted to store an index structure, said index structure comprising:

a tree with one or more paths from a root node to one or more leaf nodes, each path from the root node to any leaf node of said tree having an equal length where the length equals a number of nodes in a path;

one or more keys having said information assigned thereto being stored on one or more of said nodes, each node having at most 2k+1 sons, where k is a natural number, each of said nodes, except said root node and said leaf nodes, having at least one son, and the root node being a leaf node or having at least two sons;

wherein said leaf nodes of said tree comprise additional pointers, said additional pointers pointing from one of said leaf nodes to another one of said leaf nodes, so that a sequential search of leaf nodes may be performed without searching nodes other than leaf nodes; and wherein said computer system is used as a text retrieval system wherein a concordance list L(W) of word occurrences (W) and/or the assignment of an internal document number and the name of a corresponding document is stored on said index structure.

* * * * *